Patented Apr. 26, 1938

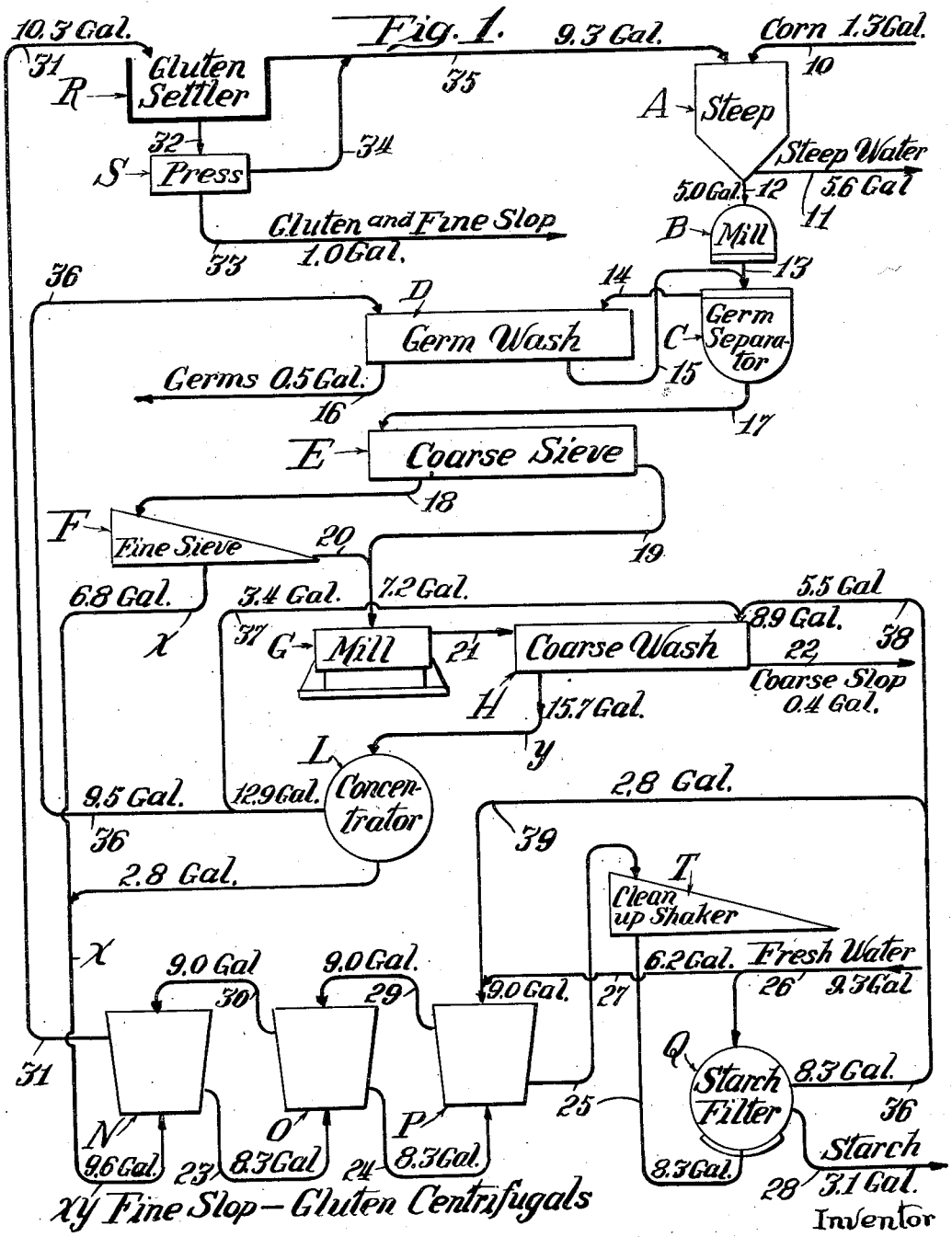

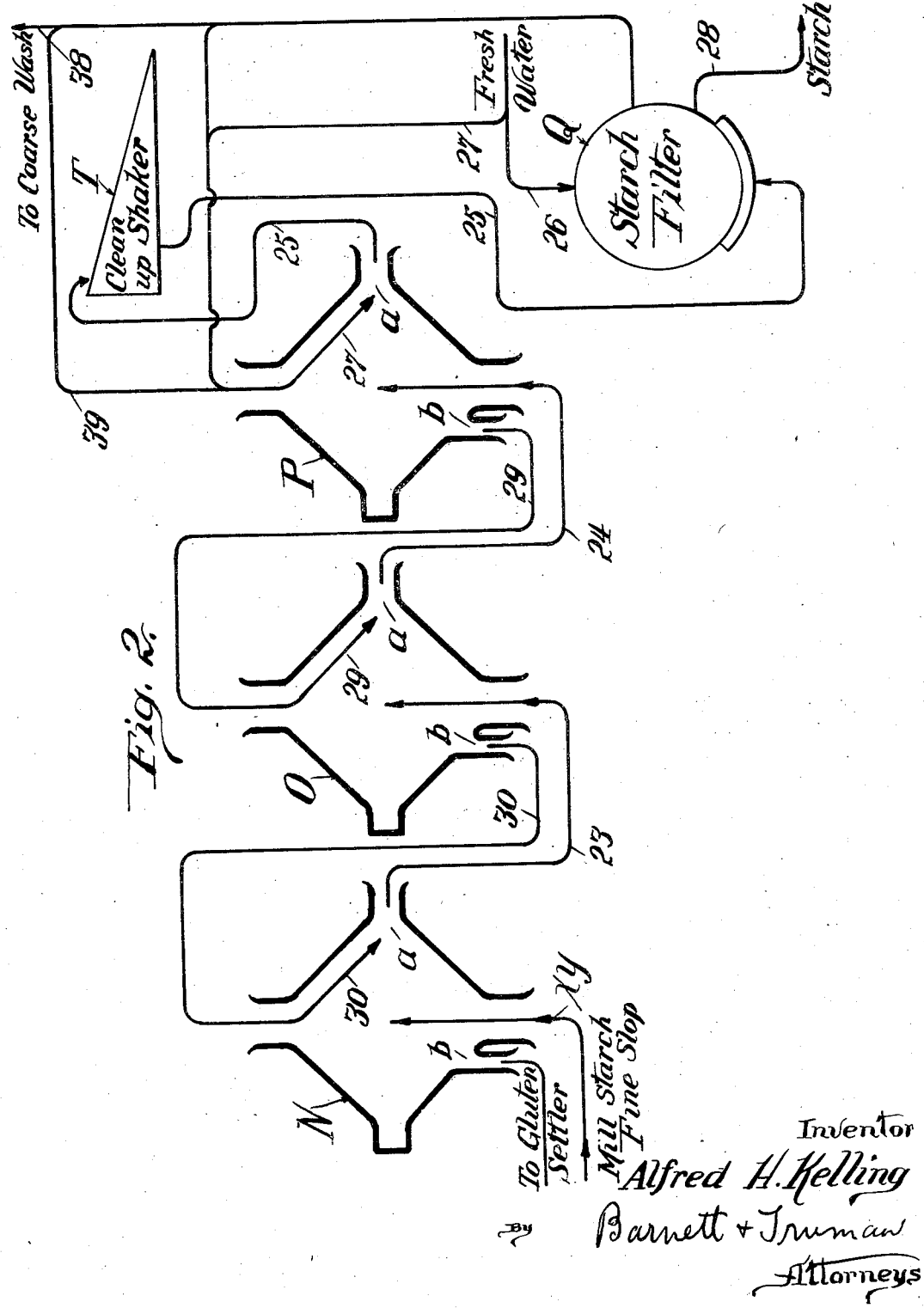

2,115,171

UNITED STATES PATENT OFFICE 2,115,171

MANUFACTURE OF STARCH

Alfred H. Kelling, Oak Park, Ill., assignor to International Patents Development Company, Wilmington, Del., a corporation of Delaware Original application June 5, 1933, Serial No. 674,366. Divided and this application June 4, 1936, Serial No. 83,543

4 Claims. (Cl. 127—68)

This invention relates to the manufacture of starch from corn by the wet method; and particularly to a process in which all, or substantially all, of the process waters (excepting the steep water and the water absorbed in the discharged solids) are returned to the process for re-use, for the purpose of saving solids, soluble and insoluble therein, and preventing the pollution of streams which results from discharging process waters from the factory.

In the manufacture of starch from corn, it has been customary to steep the corn and withdraw the steeped water to evaporators for recovery of the corn solubles contained therein. The steeped corn is then comminuted and subjected to separating operations in water for removal of the germs, hull and fiber of the corn. The usual method has been to break up the corn coarsely, remove the germs, grind the residue as finely as possible and then subject the ground material to what is known as a coarse slop washing or separating operation in which gluten and starch are washed out of the slop (hulls, bran and fiber) by passing the material through copper reels or over copper covered shakers. The mixture of starch, gluten and water from this operation is then passed through fine sieves to remove the residual or fine slop particles, which latter are then subjected to a fine slop separating or washing operation in a series of silk covered reels or on silk covered shakers, for the purpose of washing out of the fine slop the starch and gluten which it contains. The mill starch streams (starch, gluten and water) from the germ, coarse slop and fine slop separating operations are then tabled, according to customary practice, for the purpose of removing the gluten from the starch. The gluten is allowed to settle in gluten settlers, and the starch is returned from the tables, usually by flushing, and is dewatered and then washed with fresh water in washing filters. The starch filtrate and wash water and the gluten settler water are returned to the process for re-use.

In copending application of Alfred H. Kelling, filed June 12, 1933, Serial No. 675,412, a method is disclosed whereby centrifugal machines are used in place of the starch tables for the separation of the gluten from the starch, in an arrangement which permits the return to the system of all process waters in a manner particularly advantageous to the successful working of the process. In copending application Serial No. 674,366, filed June 5, 1933, of which the present application is a division, there is disclosed a process with certain modifications, whereby the centrifugals are used not only for the separation of gluten from starch but for the separation of the fine slop from the starch liquor coming from the coarse slop system and for the washing of the fine slop to remove the starch and gluten. This improvement, therefore, does away with the sieves for removing fine slop particles from the coarse slop starch liquor, and also the entire fine slop washing system consisting of silk reels and/or shakers which are expensive and inconvenient to maintain and keep in repair. In this process the arrangements are such that all of the process waters are returned to the process, except the steep water and water contained in the discharged solids, none going to the sewer; and this return of process waters is effected, furthermore, in such a manner that the water which by the nature of the process contains a relatively large quantity of soluble substances and which is obliged to remain in the process for a considerable length of time, viz.: the gluten containing overflow from the centrifugals, is returned to the process at the steeps, that is, at the stage of the process from which solubles are withdrawn for recovery. The process waters reused in the germ and slop systems are, according to the arrangement disclosed in the application last referred to, waters which contain relatively small quantities of solubles and which have remained in the process only a short time, two hours for example. The gluten containing water stands in the gluten settlers for some time, 24 hours or more, at a temperature particularly favorable to the incubation of micro-organisms. These organisms produce, if admitted to the separating operations, impurities of a colloidal character which cannot be completely washed out of the starch even by repeated filtering operations.

Moreover these inventions provide a centrifugal method whereby soluble substances, including yellow color substance, and other impurities, are eliminated from the starch containing process water intended for return to the separating operations and are concentrated in the gluten containing process water intended for return to the steeps. As a result the operations subsequent to the steeping operation are carried on with waters which are relatively pure despite the fact that all process waters are returned to the process, none, or substantially none, going to the sewer.

The use of a more or less highly infected liquid and one containing soluble substances in the steeping system causes no inconveniences. The material at this stage of the process is in the form of unbroken kernels little subject to micro-organic action or contamination by soluble impurities, and the relatively high temperatures and sulphur dioxide concentrations in the steeping system tend to inhibit bacterial action. The material in the separating operations, on the other hand, is in a finely divided state making it peculiarly subject to bacterial action and contamination by soluble impurities including color substances, and in these operations the temperatures and sulphur dioxide concentrations are much lower than in the steeping system. By using the highly infected gluten settler water with its high content of soluble substances exclusively for steeping, and by eliminating solubles and impurities from the other process waters and concentrating them in the gluten settler water, which the present process, and those of the parent application are designed to do, the separation operations are carried on in relatively pure media with the result that a purer starch is obtained and one which has a whiter color since the substances tending to give corn starch a yellowish tinge are concentrated to a large extent in the process water which is not returned to the wet starch system but is discharged through the steeps.

The present invention has for its object to provide a starch making system, using centrifugals for the removal and washing of fine slop and gluten, as well as the removal of gluten, in which a single series of centrifugal machines is used for the treatment both of the mill starch from the germ separation and also the starch liquor containing fine slop issuing from the coarse slop system, instead of two series of centrifugal machines, one for treatment of the germ system mill starch and the other for treatment of the starch liquor from the coarse slop system employed in the other forms of the invention disclosed in application 674,366; and in which, as in other forms of the invention, all of the process water may be returned to the process and re-used in such a manner as to minimize contamination of the starch in the separating operations.

The process is illustrated in the accompanying drawings, in which

Fig. 1 is a flow-sheet diagram of the whole process; and

Fig. 2 is a more detailed diagram of the centrifugal system.

In the drawings the numerals followed by the abbreviation "Gal." represent gallons of water present per bushel of corn ground. It will be understood that these water balance figures are merely illustrative. The apparatuses used are shown diagrammatically. In practice a number of units will be used, ordinarily, where a single unit is shown in the drawings. The term "pipe" as used in the description is intended to include any conduit, trough, or other conveying means whereby the material is conducted from one piece of apparatus to the other.

Referring first to Fig. 1 of the drawings: A designates one of the tanks of the steeping system which ordinarily consists of a plurality of steeping tanks arranged for counter-current operation; B the mill for breaking up the steeped corn so as to free the germs; C the germ separator containing a starch liquor of such gravity that the germs will float off while the rest of the corn sinks to the bottom of the vessel; D the germ washing system; E a coarse sieve which receives the degerminated corn from the separator C; F a fine sieve for screening the liquid from the coarse sieve E; G a mill for fine grinding the tailings from the coarse sieve E and fine sieve F; H the coarse slop washing system; and N, O and P a series of centrifugals for separating the gluten and fine slop from the mill starch derived from the germ, from the coarse slop wash and washing the slop particles to remove adhering starch and gluten. Q is a starch filter in which the starch from the centrifugals is first dewatered and then washed with fresh water; R a gluten settler for removal of gluten and slop from the overflow from the centrifugal system; S a press for pressing the water out of the gluten and slop which has subsided to settler R; T a clean-up shaker arranged in the starch line between the centrifugal system and starch filter Q; and L a concentrator for extracting water from the coarse slop mill starch before it is centrifuged.

It will be understood that the centrifugal systems may contain a larger or smaller number of centrifugal machines than shown; and that if desired the starch may be filtered successively in two or more starch filters.

The connections between the apparatuses above named will be referred to in the following description of the operation of the process.

*Operation of process.*—The corn containing 1.3 gallons of water enters the steeping system A at 10 and 5.6 gallons of steep water are drawn off at 11 and sent to the evaporators (not shown) for concentration and saving of soluble substances. The steeped corn passes through pipe 12, with 5.0 gallons of water, to the mill B and the coarse ground corn from the mill B through pipe 13 to the separator C. The germs pass through pipe 14 from the separator C to the germ washing system D, starch liquor passing back through pipe 15 to the separator C, in order to supply water of the proper gravity for floating off the germs. The latter are discharged from the germ washing system D with 0.5 gallon of water at 16. The degerminated corn passes from the separator C through pipe 17 to the coarse sieve E and the liquid from the coarse sieve E through pipe 18 to the fine sieve F. The tailings from the coarse sieve E pass through pipe 19 to the mill G and are joined by the tailings from the fine sieve F, as indicated at 20, the material entering the mill carrying 7.2 gallons of water. The mill starch (starch, gluten and water) from the fine sieve F, that is to say from the germ system, passes into pipe x, the amount being 6.8 gallons, pipe x leading to the centrifugal N.

The material which is finely ground in mill G passes through pipe 21 to the coarse slop wash H, from which the coarse slop, containing 0.4 gallon of water is discharged at 22. The starch liquor from the coarse slop wash H, (15.7 gallons) containing not only starch and gluten but also fine slop,—the fine bran and fiber usually sieved from the coarse slop starch liquor and washed free of starch and gluten in the fine slop system—passes from the coarse slop wash H into a pipe y in which is arranged the concentrator L. The concentrator L may be a settling tank, but is preferably a filter, and its function is to extract water from the mill starch in pipe y. In the water balance arrangement shown, the concentrator L extracts 12.9 gallons of water from the coarse slop mill liquor so that the concentrated material passing through the other branch of pipe y to pipe x, and thence to the centrifugal system, will contain only 2.8 gallons of water. This amount of material added to the mill starch from the germ system gives a volume of mill starch entering the centrifugal system, through pipe $x$, $y$, that is centrifugal N, of 9.6 gallons. The underflow from centrifugal N, principally starch, passes through pipe 23 to centrifugal O, the amount being 8.3 gallons; and the underflow from centrifugal O, 8.3 gallons, passes through pipe 24 to centrifugal P. The underflow from centrifugal P passes through pipe 25, in which clean-up shaker T is located, to the starch filter Q, the amount being 8.3 gallons. 9.3 gallons of fresh water enter the system through pipe 26, 3.1 gallons going to starch filter Q and 6.2 gallons through branch pipe 27 to the centrifugal P. The purified starch, containing 3.1 gallons of water, is discharged from filter Q at 28.

The overflow from centrifugal P, 9.0 gallons, passes through pipe 29, to the centrifugal O; and the overflow from centrifugal O, 9.0 gallons, passes through pipe 30 to the centrifugal N. The overflow contains gluten and fine slop.

Preferably the fresh water for the centrifugal system, introduced into the last centrifugal, and the overflow from one centrifugal to the next, as the case may be, enters the underflow or starch zone of the centrifugal into which it is introduced as shown in Fig. 2 where the starch zone of each centrifugal is designated $a$ and the outlet from the gluten zone $b$. As a result of this the solubles in the liquid treated are concentrated in the overflows from the centrifugals and ultimately in their overflow from the first centrifugal N. This is due in part to the dilution of the material in the starch zones of the centrifugals; but the actual extent of this concentration of solubles cannot be accounted for, on mathematical grounds on the basis of dilution alone. The entering starch liquor splits off water containing solubles before mingling with the wash water, thus the wash liquid, fresh water or overflow, displaces the solubles containing water in the starch zone. This concentration of the solubles in the overflow, which continues progressively through the system in the direction counter to the underflow, facilitates the washing of the starch in the starch filter, so that it may be said that the centrifugals take the place in part of the starch filters.

The process waters are returned to the process as follows:

The overflow from centrifugal N, 10.3 gallons, passes through pipe 31 to the settler R. The gluten and fine slop which sink to the bottom of settler R pass through pipe 32 to press S from which the material is discharged with 1.0 gallon of water at 33; the water from the press S going through pipe 34 to the pipe 35 which conducts the water from settler R to the steeping system A. The amount of water from both sources is 9.3 gallons. This water contains substantially all of the soluble substances from the separating system and is particularly likely to be highly infected with micro-organisms due to the relatively long incubation period in settler R. This water is not recirculated through the starch making system but is returned to that stage of the process, viz. the steeping system A, from which the steep water is discharged for the purpose of saving solubles.

Of the water extracted from the coarse slop starch liquor by concentrator L, 12.9 gallons in all, 9.5 gallons pass through pipe 36 to the germ washing system D, and 3.4 gallons through pipe 37 to the coarse wash H. This water contains a very much smaller quantity of soluble substances than the gluten settler water but has a higher soluble content than the water from the starch filter and consequently is returned to advanced points in the separating operations.

Of the water discharged from the starch filter Q, filtrate and wash water, 8.3 gallons, 5.5 gallons go through pipe 38 to the coarse slop system H and 2.8 gallons through pipe 39 to the centrifugal P, the amount of wash water entering the centrifugal, including fresh water, being therefore 9.0 gallons.

The starch making system, as above described, is extremely simple, as will be apparent, in comparison with the system of manufacturing starch from corn heretofore and for many years in common use. The single series of centrifugal machines accomplish the operations intended to be accomplished under the old system by the sieves used for taking the fine slop out of coarse slop starch liquor, by the silk screens and/or shakers of the fine slop system and by the starch tables. In addition the centrifugals remove solubles from the starch, concentrating these solubles in the overflow stream containing the gluten, and this serves two purposes: the filtering of the starch is facilitated, the primary purpose of the starch filters being to remove solubles from the starch; and a concentration of solubles in the gluten containing water is brought about which makes possible the discharge from the system of a maximum concentration of solubles at the steeps.

No claim herein is made to any invention common to this application and the other forms disclosed in the parent case, all generic claims being made in the parent case and the other forms being claimed specifically in other divisional applications. However, it is the intention to cover this application and all modifications of the herein described process within the scope of the appended claims.

I claim:

1. Process of manufacturing starch from corn which comprises: steeping and comminuting the corn; subjecting the comminuted corn to germ and coarse slop washing operations; concentrating the mill starch and fine slop from the coarse slop wash, by elimination of water, and mixing it with the mill starch from the germ wash; subjecting this mill starch mixture to a series of centrifuging operations in which the underflow moves in one direction and the wash water overflow in the other, the wash water entering the underflow zone of the centrifugal in each case; removing the gluten and fine slop from the overflow by settling and returning the settler water to the steeping operation; washing the starch with fresh water; and re-using in the process steps following the steeping operation the process waters derived from said concentrating and starch washing operations.

2. Process of manufacturing starch from corn which comprises: steeping and comminuting the corn; subjecting the comminuted corn to germ and coarse slop washing operations; concentrating the mill starch and fine slop from the coarse slop wash, by elimination of water, and mixing it with the mill starch from the germ wash; subjecting this mill starch mixture to a series of centrifuging operations in which the underflow moves in one direction and the wash water overflow in the other, the wash water entering the underflow zone of the centrifugal in each case;

removing the gluten and fine slop from the overflow by settling and returning the settler water to the steeping operation; washing the starch with fresh water; re-using water from the starch washing operation as wash waters in the centrifuging operation and coarse wash; and re-using the process water derived from the concentrating operation in the germ wash.

3. Process of manufacturing starch from corn which comprises: steeping and comminuting the corn; subjecting the comminuted corn to germ and coarse slop washing operations; concentrating the mill starch and fine slop from the coarse wash by elimination of water; mixing the concentrated mill starch with the mill starch from the germ wash and subjecting the same to a centrifuging operation which separates the magma into a gluten and fine slop carrying overflow and a starch carrying underflow; settling the overflow to remove the gluten and fine slop and returning the gluten settler water to the steeping operation; dewatering the starch carrying underflow and washing the starch with fresh water; and reusing in the steps of the process following the steeping operation, the waters derived from said concentrating operation and said starch dewatering and washing operation.

4. Process of manufacturing starch from corn which comprises: steeping and comminuting the corn; subjecting the comminuted corn to germ and coarse slop washing operations; concentrating the mill starch and fine slop from the coarse wash by elimination of water; mixing the concentrated mill starch with the mill starch from the germ wash and subjecting the same to a centrifuging operation which separates the magma into a gluten carrying overflow and a starch carrying underflow; settling the overflow to remove the gluten and fine slop and returning the gluten settler water to the steeping operation; dewatering the starch carrying underflow and washing the starch with fresh water; and re-using in the steps of the process following the steeping operation, the waters derived from said concentrating operation and said starch dewatering and washing operation, introducing them into the process at points nearer the steeping end of the system in proportion to the solubles contents of said waters respectively.

ALFRED H. KELLING.